(12) United States Patent
Knight et al.

(10) Patent No.: US 10,401,046 B2
(45) Date of Patent: Sep. 3, 2019

(54) INDOOR AND OUTDOOR UNITS FOR AN HVAC SYSTEM

(71) Applicant: Johnson Controls Technology Company, Milwaukee, WI (US)

(72) Inventors: John T. Knight, Moore, OK (US); Stephen B. Pickle, Norman, OK (US)

(73) Assignee: Johnson Controls Technology Company, Auburn Hills, MI (US)

(*) Notice: Subject to any disclaimer, the term of this patent is extended or adjusted under 35 U.S.C. 154(b) by 62 days.

(21) Appl. No.: 15/666,805

(22) Filed: Aug. 2, 2017

(65) Prior Publication Data

US 2018/0094827 A1 Apr. 5, 2018

Related U.S. Application Data

(60) Provisional application No. 62/404,650, filed on Oct. 5, 2016.

(51) Int. Cl.

| | |
|---|---|
| *F24F 11/77* | (2018.01) |
| *F24F 13/20* | (2006.01) |
| *F24F 11/30* | (2018.01) |
| *F24F 11/62* | (2018.01) |
| *F24F 11/79* | (2018.01) |
| *F24F 1/0059* | (2019.01) |
| *F24F 1/14* | (2011.01) |
| *F24F 11/74* | (2018.01) |

(Continued)

(52) U.S. Cl.
CPC ............ *F24F 11/77* (2018.01); *F24F 1/0059* (2013.01); *F24F 1/14* (2013.01); *F24F 11/30* (2018.01); *F24F 11/62* (2018.01); *F24F 11/74* (2018.01); *F24F 11/79* (2018.01); *F24F 13/20* (2013.01); *F24F 11/46* (2018.01); *F24F 2140/50* (2018.01)

(58) Field of Classification Search
CPC .... F24F 11/77; F24F 11/74; F24F 1/14; F24F 1/0059; F24F 11/30; F24F 11/79; F24F 11/62; F24F 13/20; F24F 2140/50; F24F 11/46; F24F 12/003; F24F 3/153; F24F 3/1405; F24B 41/04; F24B 13/00; H02J 5/005

See application file for complete search history.

(56) References Cited

U.S. PATENT DOCUMENTS

| | | | |
|---|---|---|---|
| 6,109,339 A | * | 8/2000 | Talbert ...................... F24H 1/43 165/48.1 |
| 6,116,048 A | | 9/2000 | Hebert |
| 7,032,411 B2 | | 4/2006 | Hebert |

(Continued)

*Primary Examiner* — Emmanuel E Duke
(74) *Attorney, Agent, or Firm* — Fletcher Yoder, P.C.

(57) ABSTRACT

A heating, ventilating, and air conditioning (HVAC) system includes a compressor configured to circulate a fluid through the HVAC system, a first coil configured to establish a first heat exchange relationship between the fluid and a first airflow across the first coil, a second coil configured to establish a second heat exchange relationship between the fluid and a second airflow across the second coil, and a fan configured to direct the first airflow across the first coil, the second airflow across the second coil, or both, and where the first airflow across the first coil is directed to be isolated from the second airflow across the second coil, and the first airflow is blocked from flowing across the first coil when the first coil is inactive and the second airflow is blocked from flowing across the second coil when the second coil is inactive.

22 Claims, 12 Drawing Sheets

(51) Int. Cl.
  *F24F 140/50* (2018.01)
  *F24F 11/46* (2018.01)

(56) References Cited

U.S. PATENT DOCUMENTS

| | | |
|---|---|---|
| 8,651,391 B2 | 2/2014 | Patch |
| 2010/0269520 A1 | 10/2010 | Moore |
| 2013/0036754 A1 | 2/2013 | Moore |
| 2013/0255290 A1* | 10/2013 | Wu .......................... F25B 7/00 62/115 |

\* cited by examiner

INDOOR AND OUTDOOR UNITS FOR AN HVAC SYSTEM

CROSS REFERENCE TO RELATED APPLICATION

This application benefits from the priority of U.S. Provisional Patent Application No. 62/404,650, entitled "Method to Increase the Integrated Energy Efficiency Ratio," filed Oct. 5, 2016, which is hereby incorporated by reference in its entirety.

BACKGROUND

The present disclosure relates generally to environmental control systems, and more particularly, to improved indoor and outdoor units for environmental control systems.

Environmental control systems are utilized in residential, commercial, and industrial environments to control environmental properties, such as temperature and humidity, for occupants of the respective environments. The environmental control system may control the environmental properties through control of an airflow delivered to the environment. For example, a heating, ventilating, and air conditioning (HVAC) system includes heat exchange units (e.g., indoor and outdoor units) that place the airflow in a heat exchange relationship with a working fluid (e.g., refrigerant) to heat and/or cool the airflow. Traditionally, heat exchange units of HVAC systems are rated based on an energy efficiency ratio (EER) that measures an efficiency of a respective heat exchange unit when operating at full capacity. Recent regulations have introduced an integrated energy efficiency ratio (IEER) that rates a respective heat exchange unit based on weighted efficiencies of the respective heat exchange unit at partial loads. Unfortunately, existing heat exchange units that have relatively high ratings based on EER may have low IEERs because of reduced performance at partial loads.

SUMMARY

In one embodiment, a heating, ventilating, and air conditioning (HVAC) system includes a compressor configured to circulate a working fluid through the HVAC system, a first coil configured to receive the working fluid and to establish a first heat exchange relationship between the working fluid and a first airflow across the first coil, a second coil configured to receive the working fluid and to establish a second heat exchange relationship between the working fluid and a second airflow across the second coil, and a fan configured to direct the first airflow across the first coil, the second airflow across the second coil, or both, and where the first airflow across the first coil is directed to be isolated from the second airflow across the second coil, and the first airflow is blocked from flowing across the first coil when the first coil is inactive and the second airflow is blocked from flowing across the second coil when the second coil is inactive.

In another embodiment, a heating, ventilating, and air conditioning (HVAC) system includes a compressor configured to circulate a working fluid through the HVAC system, a first coil configured to receive the working fluid and to establish a first heat exchange relationship between the working fluid and a first airflow across the first coil, a second coil configured to receive the working fluid and to establish a second heat exchange relationship between the working fluid and a second airflow across the second coil, a barrier positioned between the first coil and the second coil, where the barrier is configured to isolate the first airflow across the first coil from the second airflow across the second coil, a fan configured to direct the first airflow across the first coil, the second airflow across the second coil, or both, a sensor configured to determine an operating state of the first coil and the second coil, and a control system configured to receive feedback from the sensor indicative of an operating state of the first coil and the second coil, block the first airflow across the first coil when the feedback indicates that first coil is inactive, block the second airflow across the second coil when the feedback indicates that the second coil is inactive, direct the first airflow across the first coil when the feedback indicates that the first coil is active, and direct the second airflow across the second coil when the feedback indicates that the second coil is active.

In another embodiment, a method includes receiving feedback indicative of an operating state of a coil of a heat exchange unit, determining whether a working fluid is flowing through the coil of the heat exchange unit based on the feedback, blocking an airflow across the coil of the heat exchange unit when the feedback indicates that the working fluid is not flowing through the coil of the heat exchange unit, and directing a second airflow across the coil of the heat exchange unit when the feedback indicates that the working fluid is flowing through the coil of the heat exchange unit.

DRAWINGS

DETAILED DESCRIPTION

Figure 1:
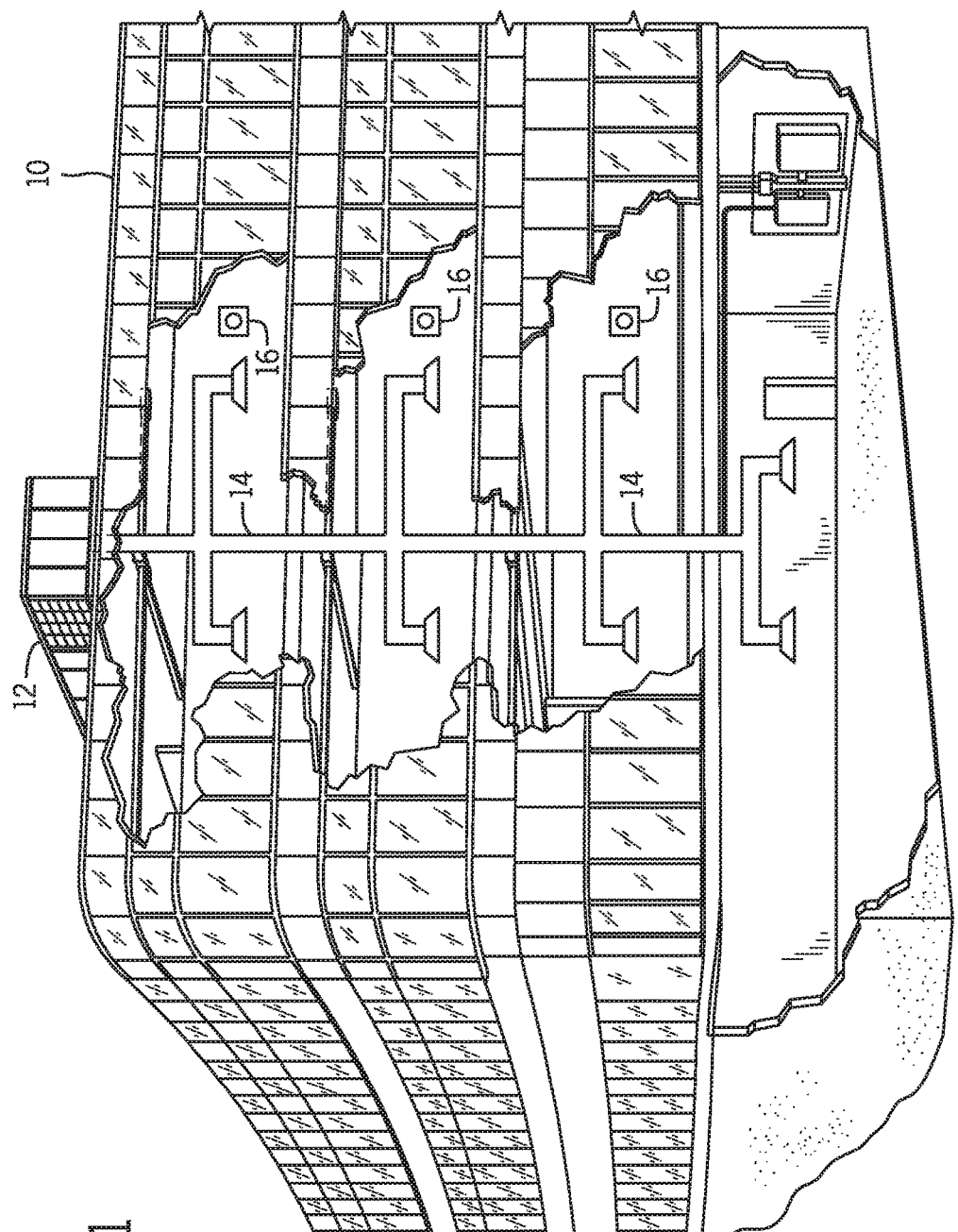
FIG. 1 is a perspective view of an environmental control for building environmental management that may employ one or more HVAC units, in accordance with an aspect of the present disclosure.

Embodiments of the present disclosure are directed toward improved heat exchange units (e.g., indoor and outdoor heat exchange units) that are utilized in heating, ventilating, and air conditioning (HVAC) systems. More specifically, embodiments of the present disclosure are directed to heat exchange units of an HVAC system that have an increased integrated energy efficiency ratio (IEER). Traditionally, heat exchange units of HVAC systems are rated based on an energy efficiency ratio (EER). The EER calculates a rating of a respective heat exchange unit based on an efficiency of the respective heat exchange unit when operating at full capacity (e.g., 100% load). For example, the EER may be determined based on an output capacity of the heat exchange unit at full load and an amount of power input to the heat exchange unit to operate the heat exchange unit at full load conditions. Recent regulations rate heat exchange units of HVAC systems based on an integrated energy efficiency ratio (IEER), which calculates a rating based on weighted efficiencies of a respective heat exchange unit at partial loads. For example, the IEER may emphasize an efficiency of the respective heat exchange unit when operating at 75% load as opposed to the EER, which calculates a rating based only on full load efficiency. In some cases, heat exchange units that operate with relatively high EERs may have low IEERs as a result of reduced efficiency when operating at partial loads.

Accordingly, embodiments of the present disclosure are directed toward improved heat exchange units that operate with an increased IEER when compared to existing heat exchange units. It is now recognized that the IEER is reduced when airflow is directed over inactive coils of the heat exchange unit or coils that do not include a flow of working fluid. For example, when a heat exchange unit operates at a partial load, working fluid of the heat exchange unit may bypass one or more coils of the heat exchange unit to reduce an amount of heating and/or cooling of the airflow. Existing heat exchange units direct the airflow over all of the coils in the heat exchange unit regardless of operating mode. To increase the IEER, embodiments of the present disclosure include one or more separators or partitions that isolate coils within the heat exchange unit from one another.

In some embodiments, the separators may be positioned between each coil of the heat exchange unit to isolate the coils from one another. Accordingly, the separators may form sections within the heat exchange unit and each section may include a corresponding fan and/or compressor. In other embodiments, a fan and/or compressor may be shared between sections of the heat exchange unit that are formed by the separators. Further, in some embodiments, the separators may be louvers that enable sequential flow between sections of the heat exchange unit when the louvers are in an open position and block flow between sections of the heat exchange unit when the louvers are in a closed position. Accordingly, the louvers may be adjusted from the open position to the closed position when a coil of the heat exchange unit is inactive and no working fluid flows through the coil. In some embodiments, the fans included in the heat exchange unit are variable speed fans, such that a flow rate of the airflow through the heat exchange unit is reduced when one or more coils are inactive. In other embodiments, the fans may be plenum fans that may be powered on when a corresponding coil is active and powered off when the corresponding coil is inactive. In any case, heat exchange units of the present disclosure isolate inactive coils from active coils to block airflow over the inactive coils when the unit operates at partial loads. Blocking airflow over the inactive coils increases the IEER of the heat exchange unit.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
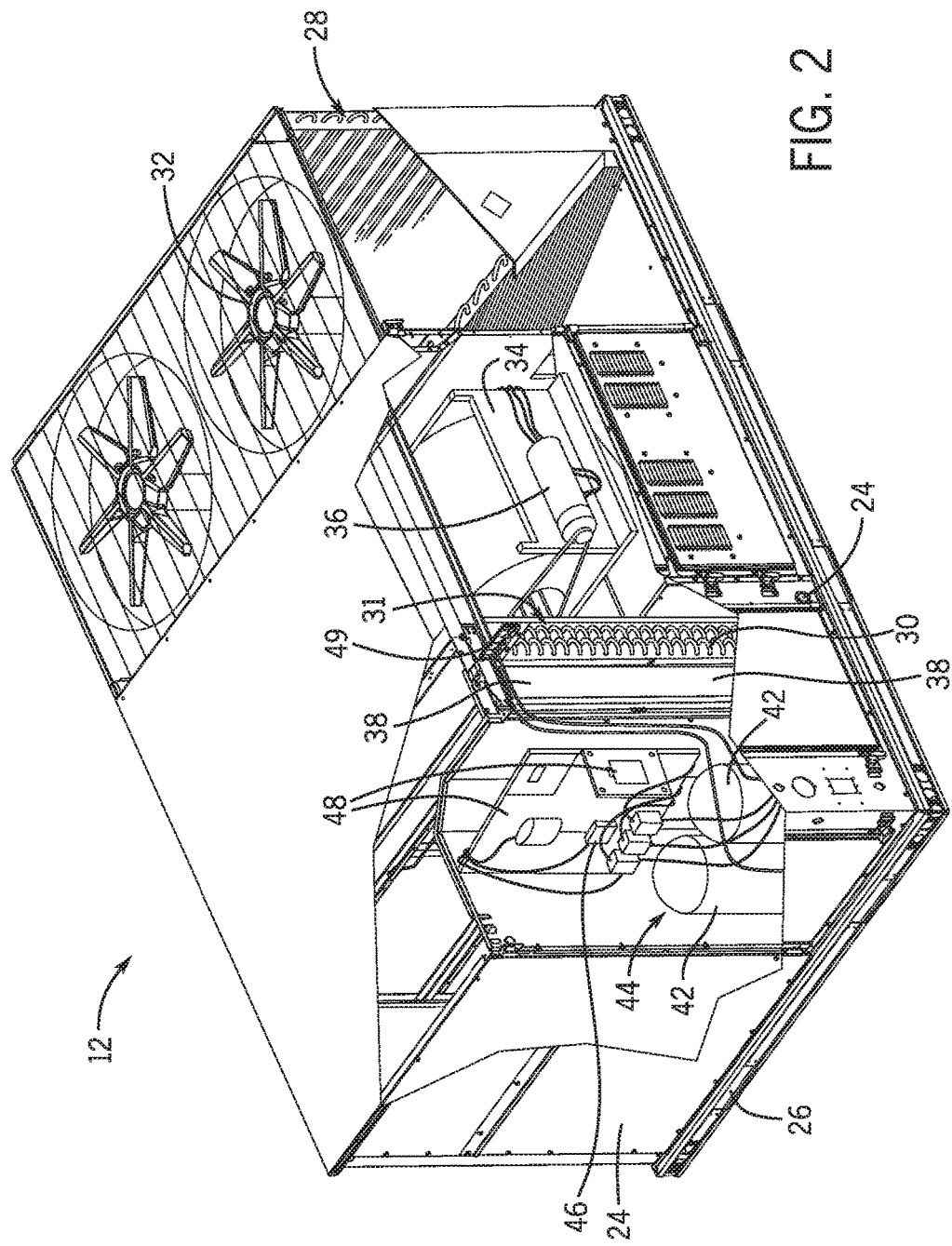
FIG. 2 is a perspective view of an embodiment of the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
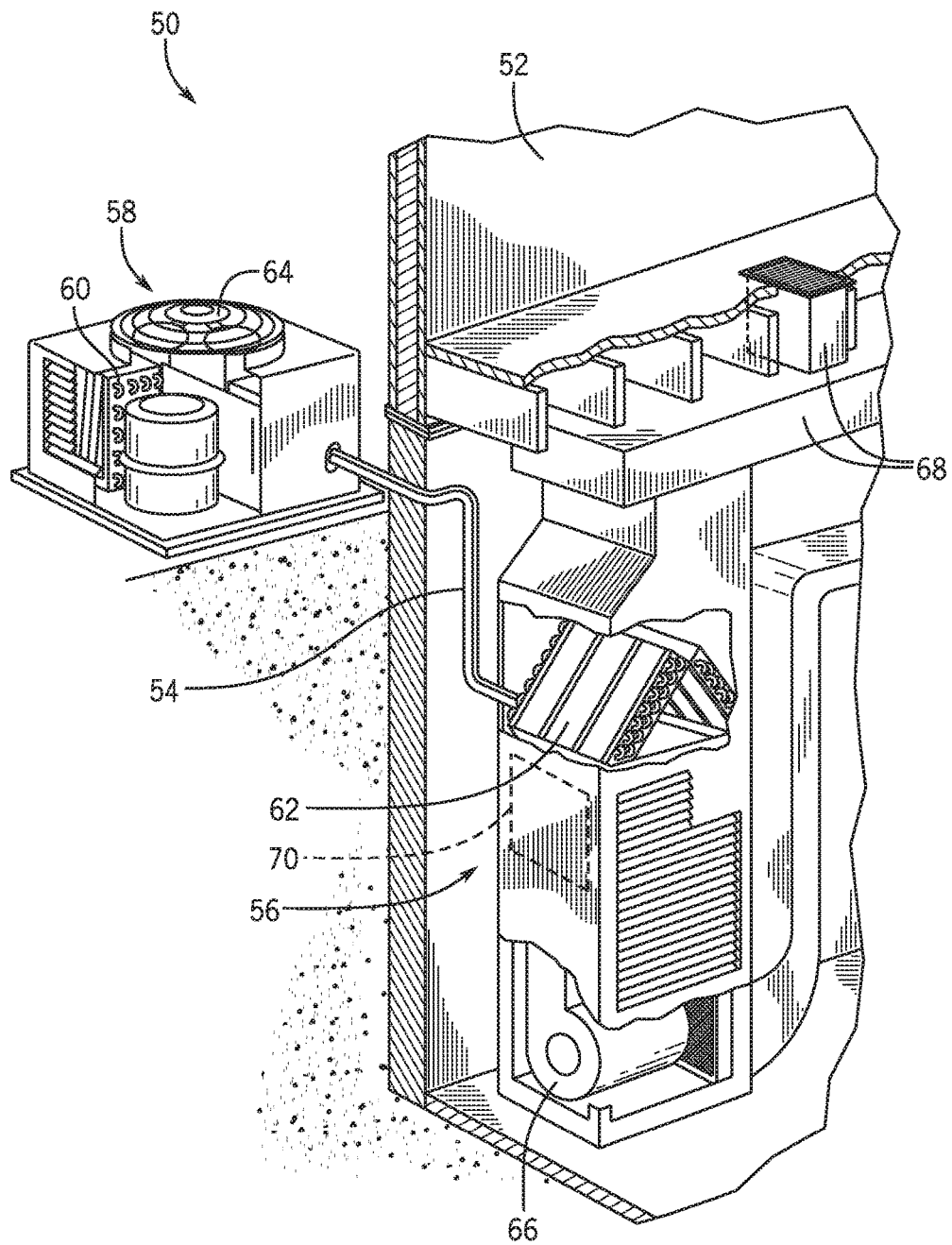
FIG. 3 is a perspective view of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
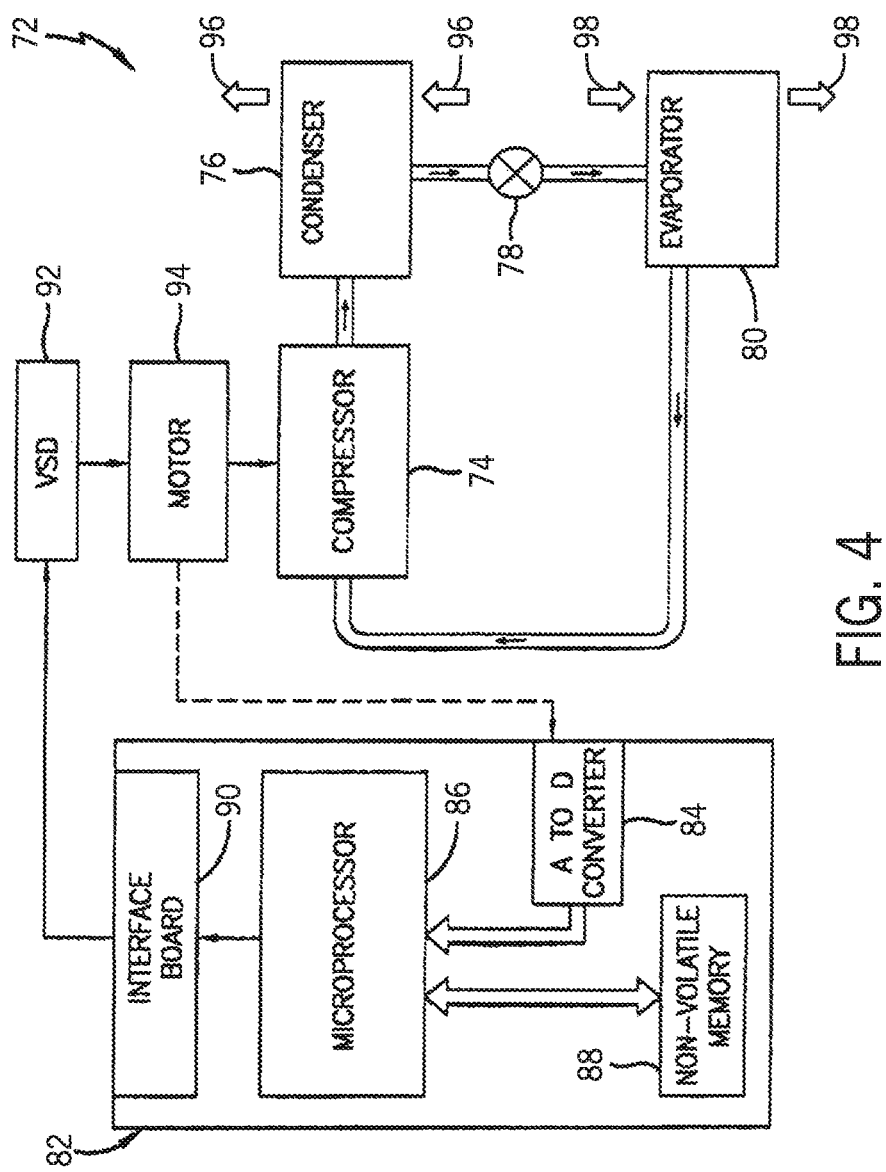
FIG. 4 is a schematic of an embodiment of a vapor compression system that can be used in any of the systems of FIGS. 1-3, in accordance with an of aspect the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor, a scroll compressor, a reciprocating compressor, a screw compressor, a tandem compressor, or another suitable compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
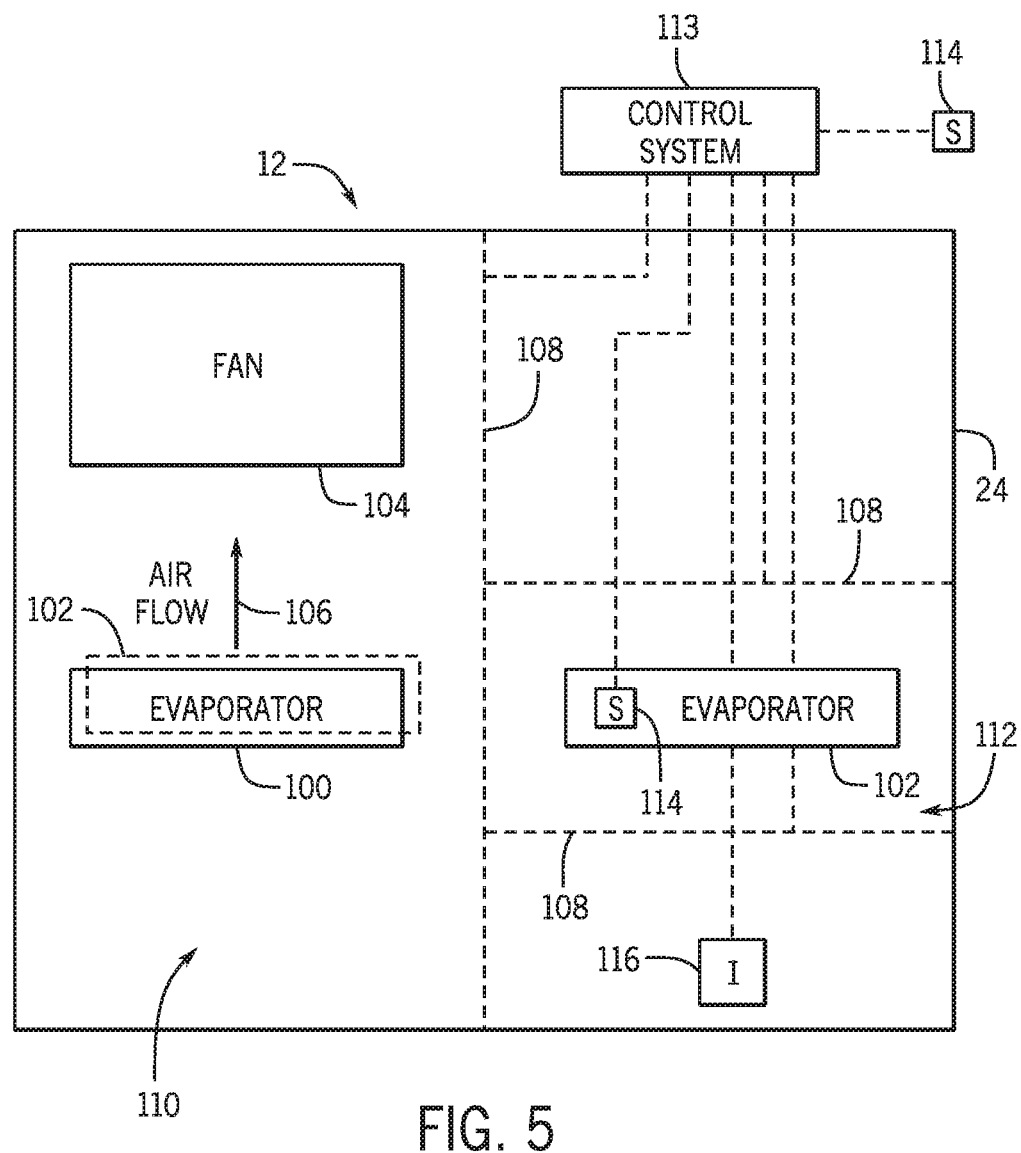
FIG. 5 is a schematic of an embodiment of an indoor unit that may be used in the systems of FIGS. 1-3, in accordance with an aspect of the present disclosure.

As set forth above, present embodiments are directed to the HVAC unit 12, which could be an indoor unit or an outdoor unit, having an improved integrated energy efficiency ratio (IEER). The IEER of the HVAC unit 12 decreases when an airflow through the HVAC unit 12 is directed over an inactive coil of the HVAC unit 12. Accordingly, embodiments of the present disclosure are directed to isolating inactive coils of the HVAC unit 12 from active coils, such that the airflow through the HVAC unit 12 does not flow over the inactive coils. For example, FIG. 5 is a schematic of an embodiment of the HVAC unit 12, such as an indoor unit, that includes a first evaporator 100 and a second evaporator 102 disposed in the cabinet 24. While the illustrated embodiment of FIG. 5 shows the HVAC unit 12 having two evaporators, other embodiments of the HVAC unit 12 may include more than two evaporators. In any case, the HVAC unit 12 also includes a fan 104, such as a variable speed fan, that directs an airflow 106 through the HVAC unit 12. For example, the fan 104 draws air into the cabinet 24 from an environment surrounding the cabinet 24, over the first evaporator 100 and/or the second evaporator 102, and out of the cabinet 24 (e.g., to the ductwork 14).

As shown in the illustrated embodiment of FIG. 5, a louver 108 is positioned between the first evaporator 100 and the second evaporator 102. Additionally, the louver 108 may be further positioned upstream and/or downstream of the second evaporator 102 with respect to the airflow 106 through the cabinet 24. As used herein, the louver 108 is a divider having adjustable slats that may be opened and closed (e.g., manually or with the control board 48 and/or the control panel 82) based on operation of the first evaporator 100 and the second evaporator 102. For example, the louver 108 may be in an open position when both the first evaporator 100 and the second evaporator 102 are in an active state, such as when a working fluid flows through the first evaporator 100 and the second evaporator 102. Accordingly, the airflow 106 is directed over coils of both the first evaporator 100 and the second evaporator 102 to establish a heat exchange relationship between the airflow 106 and the working fluid in both the first evaporator 100 and the second evaporator 102.

In some embodiments, the second evaporator 102 is inactive when the HVAC unit 12 operates at a partial load, such as when a heating or cooling demand is reduced. In other words, the working fluid may bypass the second evaporator 102 and/or otherwise not flow through the second evaporator 102 when the HVAC unit 12 operates at partial load conditions. As such, the louver 108 may be switched from the open position to the closed position to block the airflow 106 from flowing over the second evaporator 102. Switching the louver 108 from the open position to the closed position may include adjusting a position of the slats of the louver 108, such that the louver 108 forms a solid wall between the first evaporator 100 and the second evaporator 102. When in the closed position, the louver 108 separates the cabinet 24 of the HVAC unit 12 into a first section 110 and a second section 112, where the airflow 106 flows through the first section 110 but not the second section 112. Therefore, airflow 106 is blocked from flowing over the inactive second evaporator 102, which increases the IEER of the HVAC unit 12.

In some embodiments, a control system 113, such as the control board 48 and/or the control panel 82 adjusts the louver 108 from the open position to the closed position, and vice versa. The control system 113 may adjust the louver 108 between the open and closed positions based on feedback received from one or more sensors. For example, the HVAC unit 12 may include sensor 114, such as a load sensor, a flow sensor, a pressure sensor, a voltage sensor coupled to a compressor, and/or another suitable sensor that provides feedback to the control system 113 indicative of a status of the second evaporator 102. The control system 113 may adjust the louver 108 from the open position to the closed position when the feedback indicates that the second evaporator 102 has switched from active to inactive. Similarly, the control system 113 may adjust the louver 108 from the closed position to the open position when the feedback indicates that the second evaporator 102 has switched from inactive to active. In other embodiments, the louver 108 is adjusted manually. In such embodiments, the HVAC unit 12 may include an indicator 116 that alerts an operator when the second evaporator 102 switches between the active and inactive conditions. In still further embodiments, the control system 113 monitors operation of a compressor supplying working fluid to the second evaporator 102 and adjusts the louver 108 based on operation of the compressor. For example, when a voltage supplied to the compressor and/ the compressor speed falls below a threshold, the control system 113 may close the louver 108 to block the airflow 106 over the second evaporator 102. In such embodiments, the control system 113 may include a switch that automatically adjusts the louver 108 to the closed position when an operating parameter of the compressor supplying the working fluid to the second evaporator 102 falls below a threshold, indicating that the compressor is not operating. In any case, the louver 108 blocks the airflow 106 from flowing over coils of the second evaporator 102 when the second evaporator 102 is inactive, thereby increasing the IEER of the HVAC unit 12.

Figure 6:
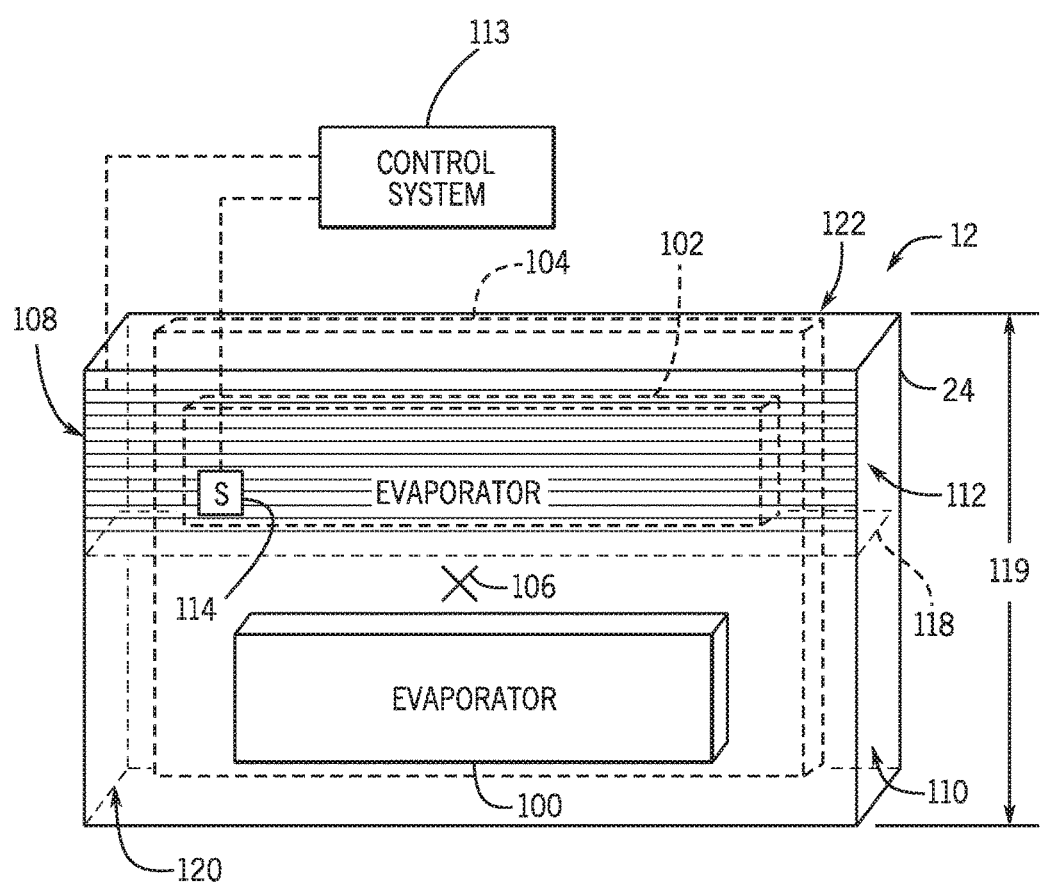
FIG. 6 is a perspective view of an embodiment of an indoor unit that may be used in the systems of FIGS. 1-3, in accordance with an aspect of the present disclosure.

In the illustrated embodiment of FIG. 5, the first evaporator 100 and the second evaporator 102 are positioned side by side relative to the airflow 106 through the cabinet 24. However, in other embodiments, the first evaporator 100 is positioned below the second evaporator 102 (as shown in dashed lines in FIG. 5). For example, FIG. 6 is a perspective view of an embodiment of the HVAC unit 12 having the evaporators 100 and 102 positioned in a stacked arrangement. As shown in the illustrated embodiment of FIG. 6, a barrier 118 is positioned between the first evaporator 100 and the second evaporator 102 with respect to a height 119 of the cabinet 24. Thus, the cabinet 24 is separated into the first section 110 and the second section 112 by the barrier 118. Further, the louver 108 is positioned on an intake side 120 of the cabinet 24 and aligned with the second evaporator 102 along the height 119 of the cabinet 24. The fan 104 is positioned adjacent to an outlet side 122 of the cabinet 24 or in another suitable position in the cabinet 24 that is downstream of the evaporators 100 and 102 with respect to the airflow 106. As such, the fan 104 draws the airflow 106 across both the first evaporator 100 and the second evaporator 102 when the louver 108 is in the open position. When the louver 108 is adjusted to the closed position, the airflow 106 is blocked from flowing across the second evaporator 102 because air is blocked from being drawn into the second section 112 of the cabinet 24 by the louver 108. While the louver 108 is illustrated in alignment with the second evaporator 102, in other embodiments, the louver 108 may be aligned with the first evaporator 100 along the height 24 of the cabinet. In any case, the louver 108 blocks airflow across the first evaporator 100 and/or the second evaporator 102 when the first evaporator 100 and/or the second evaporator 102 are in an inactive state, respectively.

Figure 7:
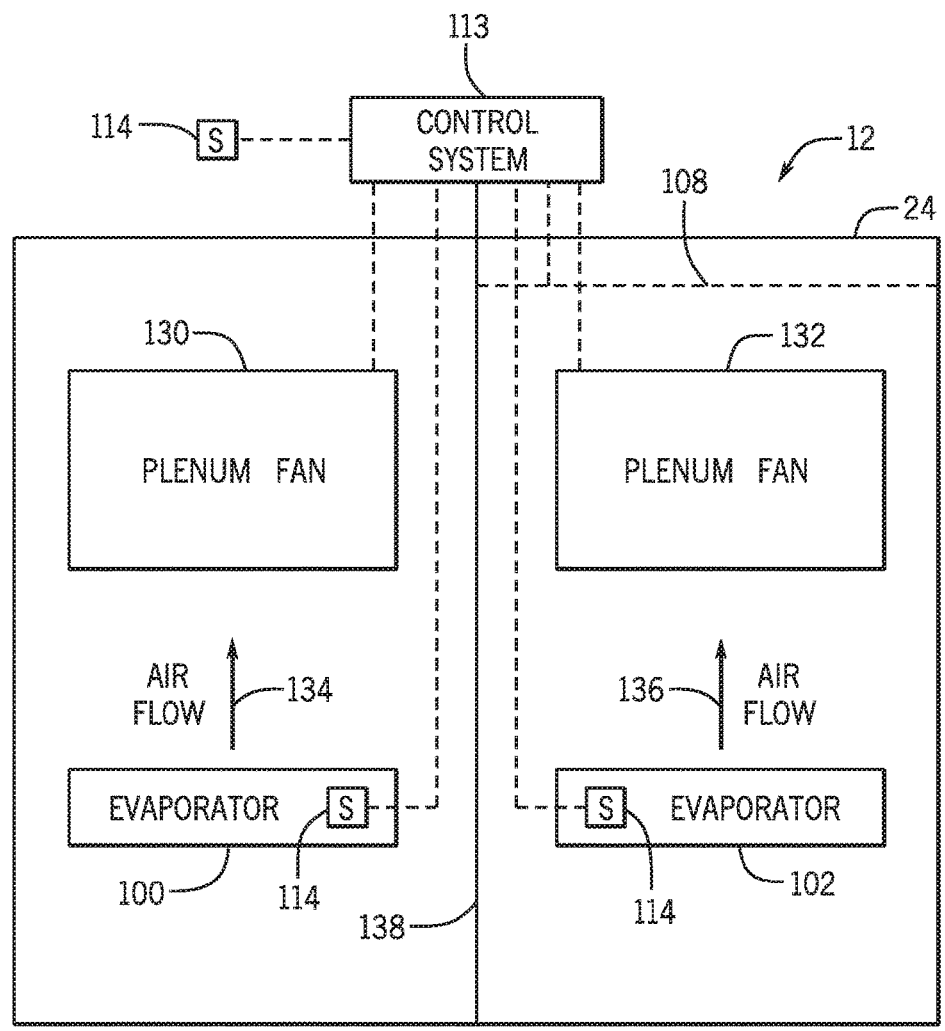
FIG. 7 is a schematic of an embodiment of an indoor unit that may be used in the systems of FIGS. 1-3, in accordance with an aspect of the present disclosure.

FIG. 7 is a schematic of an embodiment of the HVAC unit 12, such as an indoor unit, that includes a first fan 130 corresponding to the first evaporator 100 and a second fan 132 corresponding to the second evaporator 102. In some embodiments, the first fan 130 and the second fan 132 may be plenum fans. As used herein, a plenum fan is a fan that does not include a separate housing from the HVAC unit 12 and discharges air in multiple directions (e.g., into the ductwork 14). Plenum fans may include a single speed and may operate at relatively low capacities, such that a single plenum fan provides a sufficient airflow 134 and/or 136 over a respective evaporator 100 and/or 102 to achieve a desired heating load or cooling load for the building 10. As shown in the illustrated embodiment of FIG. 7, the first evaporator 100 and the second evaporator 102, and thus the first fan 130 and the second fan 132, are separated by a divider 138. The divider 138 may be a solid barrier, such as a wall, that isolates the airflow 134 from the airflow 136. In some embodiments, the louver 108 may be positioned downstream of the fan 132 with respect to the airflow 136 to block recirculation of the airflow 134 when the evaporator 102 is inactive. The airflow 136 and the airflow 134 ultimately converge into the ductwork 14, for example, and thus, the airflow 134 may flow toward the evaporator 102 from the ductwork 14. As such, the louver 108 may be closed when the evaporator 102 is inactive to block the airflow 134 from flowing back toward the evaporator 102. In other embodiments, the fan 132 may include inlet guide vanes that are configured to block the airflow 134 toward the evaporator 102 from the ductwork.

When the first evaporator 100 or the second evaporator 102 switches from an active state to an inactive state, the first fan 130 or the second fan 132 is powered off. For example, when the first evaporator 100 is in the inactive state, the first fan 130 is powered off to interrupt the airflow 134 through the HVAC unit 12. Similarly, when the second evaporator 102 is in the inactive state, the second fan 132 is powered off to interrupt the airflow 136 through the HVAC unit 12. Therefore, when either the first evaporator 100 or the second evaporator 102 switches to the inactive state, the airflow 134 or 136 is stopped, such that air does not flow over inactive coils of the HVAC unit 12. As a result, the IEER of the HVAC unit is increased.

In some embodiments, the control system 113 is communicatively coupled to the first fan 130 and the second fan 132. Additionally, the control system 113 receives feedback from the sensor 114 indicative of the status of the first evaporator 100 and/or the second evaporator 102. Accordingly, the control system 113 may selectively operate the first fan 130 and the second fan 132 based on the feedback from the sensor 114. For example, when the sensor 114 indicates that the first evaporator 100 is in an inactive state, the control system 113 may interrupt a power supply to the first fan 130, such that the airflow 134 does not flow over the coils of the first evaporator 100. Similarly, when the sensor 114 indicates that the second evaporator 102 is in an inactive state, the control system 113 may interrupt a power supply to the second fan 132, such that the airflow 136 does not flow over the coils of the second evaporator 102. As such, air does not flow over the first evaporator 100 or the second evaporator 102 when the first evaporator 100 or the second evaporator 102 are in the inactive state, respectively, which increases the IEER of the HVAC unit 12.

Figure 8:
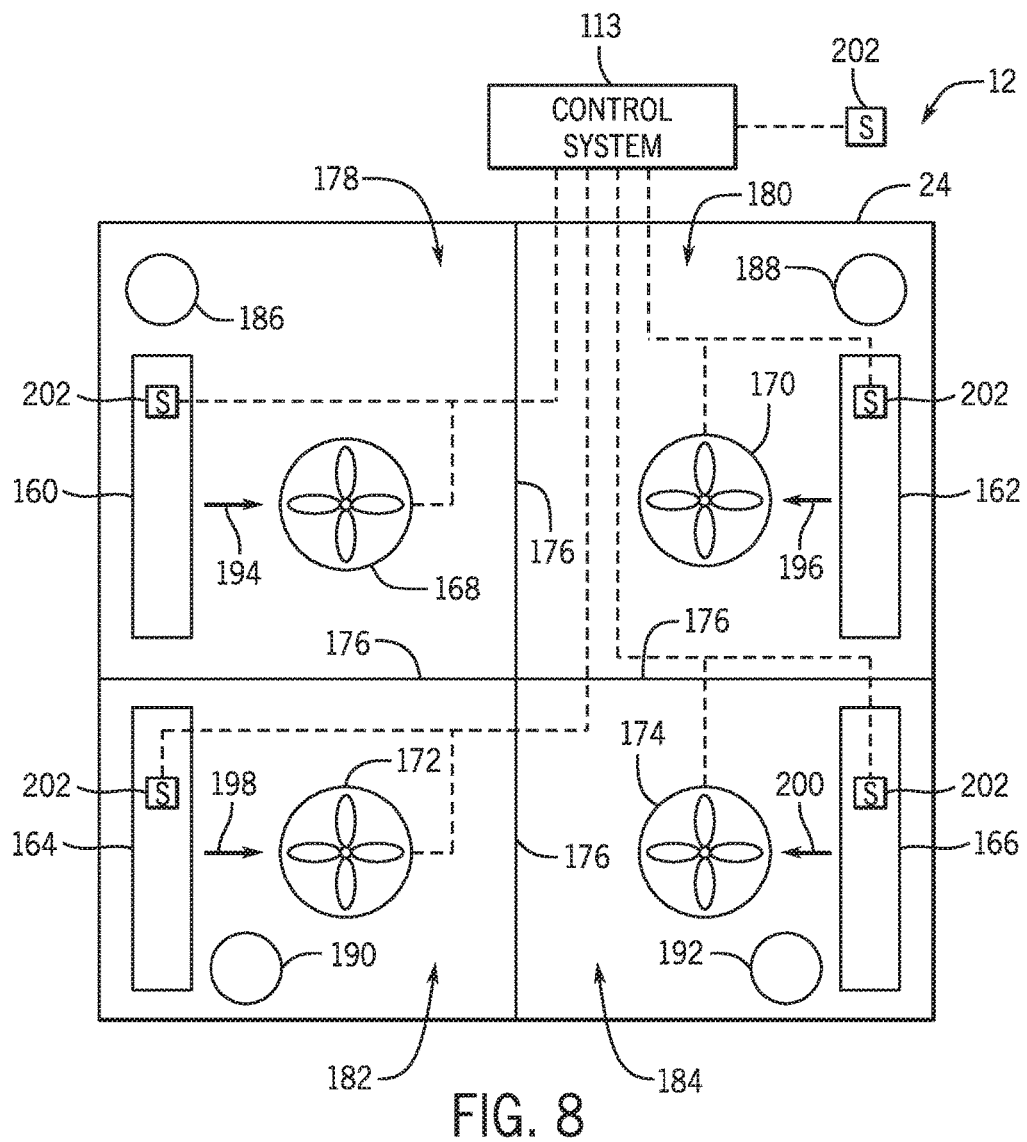
FIG. 8 is a schematic of an embodiment of an outdoor unit that may be used in the systems of FIGS. 1-3, in accordance with an aspect of the present disclosure.

In some embodiments, the HVAC unit 12, such as an outdoor unit, includes condensers that receive working fluid from a compressor and place the working fluid in a heat exchange relationship with an airflow through the HVAC unit 12. For example, FIG. 8 is a schematic of an embodiment of the HVAC unit 12 having a first condenser 160, a second condenser 162, a third condenser 164, and a fourth condenser 166. Additionally, the HVAC unit 12 includes a first fan 168, a second fan 170, a third fan 172, and a fourth fan 174. The condensers 160, 162, 164, and/or 166 as well as the fans 168, 170, 172, and/or 174 may be equally sized and include the same capacity. In other embodiments, the condensers 160, 162, 164, and/or 166 as well as the fans 168, 170, 172, and/or 174 may include different sizes and capacities. For example, in some embodiments, the fans 168, 170, 172, and/or 174 may be multi-speed fans and/or variable speed fans. Additionally or alternatively, the fans 168, 170, 172, and/or 174 may be operated utilizing a control scheme, such as a control scheme that operates the fans 168, 170, 172, and/or 174 based on head pressure of the working fluid. As shown in the illustrated embodiment of FIG. 8, the HVAC unit 12 of the illustrated embodiment of FIG. 8 is a four-stage unit that may operate using any combination of the condensers 160, 162, 164, and/or 166. While the illustrated embodiment of FIG. 8 shows the HVAC unit 12 having four condensers, in other embodiments the HVAC unit 12 may include less than four condensers or more than four condensers. The condensers 160, 162, 164, and 166 are isolated from one another by dividers 176. The dividers 176 form a first section 178 having the first condenser 160 and the first fan 168, a second section 180 having the second condenser 162 and the second fan 170, a third section 182 having the third condenser 164 and the third fan 172, and a fourth section 184 having the fourth condenser 166 and the fourth fan 174.

In some embodiments, the dividers 176 form a cross shape to separate the cabinet 24 of the HVAC unit 12 into the sections 178, 180, 182, and/or 184. In other embodiments, the dividers 176 form another suitable shape (e.g., see FIGS. 8-10) to separate the cabinet 24 into any suitable number of sections. The dividers 176 may be formed from the same material as the cabinet 24 and may be integral with the cabinet 24. For example, the dividers 176 may include a metallic material, such as stainless steel, steel, aluminum, copper, etc., that is the same material as the cabinet 24. In other embodiments, the dividers 176 may include a polymeric material, such as plastic, that blocks airflow between sections within the cabinet 24. In still further embodiments, the dividers 176 may include any suitable material that blocks airflow between the sections 178, 180, 182, and 184 of the cabinet 24.

In the illustrated embodiment of FIG. 8, the HVAC unit 12 also includes a first compressor 186 in the first section 178, a second compressor 188 in the second section 180, a third compressor 190 in the third section 182, and a fourth compressor 192 in the fourth section 184. In other embodiments, a compressor may be shared between condensers 160, 162, 164, and/or 166 of the sections 178, 180, 182, and/or 184. The compressors 186, 188, 190, and/or 192 may be equally sized and include the same capacity. In other embodiments, the compressors 186, 188, 190, and/or 192 may include different sizes and capacities. For example, the compressors 186, 188, 190, and/or 192 may include multi-staged compressors, multi-speed compressors, tandem compressors, and/or variable speed compressors. In any case, the compressors 186, 188, 190, and/or 192 control a flow rate of working fluid through the condensers 160, 162, 164, and/or 166. As discussed above, the HVAC unit 12 includes four stages, such that the HVAC unit 12 may operate with working fluid flowing through one, two, three, or all four of the condensers 160, 162, 164, and/or 166. To increase the IEER of the HVAC unit 12, the fans 168, 170, 172, and/or 174 and the compressors 186, 188, 190, and/or 192 may be selectively operated based on an operating state (e.g., active state or inactive state) of the condensers 160, 162, 164, and/or 166.

For example, the first fan 168 receives power and directs an airflow 194 across coils of the first condenser 160 when working fluid flows through the coils of the first condenser 160, such as via the first compressor 186. Additionally, the second fan 170 receives power and directs an airflow 196 across coils of the second condenser 162 when working fluid flows through the coils of the second condenser 162, such as via the second compressor 188. The third fan 172 receives power and directs an airflow 198 across coils of the third condenser 164 when working fluid flows through the coils of the third condenser 164, such as via the third compressor 190. Further, the fourth fan 174 receives power and directs an airflow 200 across coils of the fourth condenser 166 when working fluid flows through the coils of the fourth condenser 166, such as via the fourth compressor 192.

In some embodiments, the HVAC unit 12 includes sensors 202 that provide feedback to the control system 113 indicative of an operating state of the condensers 160, 162, 164, and/or 166. Accordingly, the control system 113 may selectively operate the fans 168, 170, 172, and 174 based on the feedback received from the sensors 202. Airflow may not flow over the coils of inactive condensers 160, 162, 164, and/or 166, which may increase the IEER of the HVAC unit 12.

Figure 9:
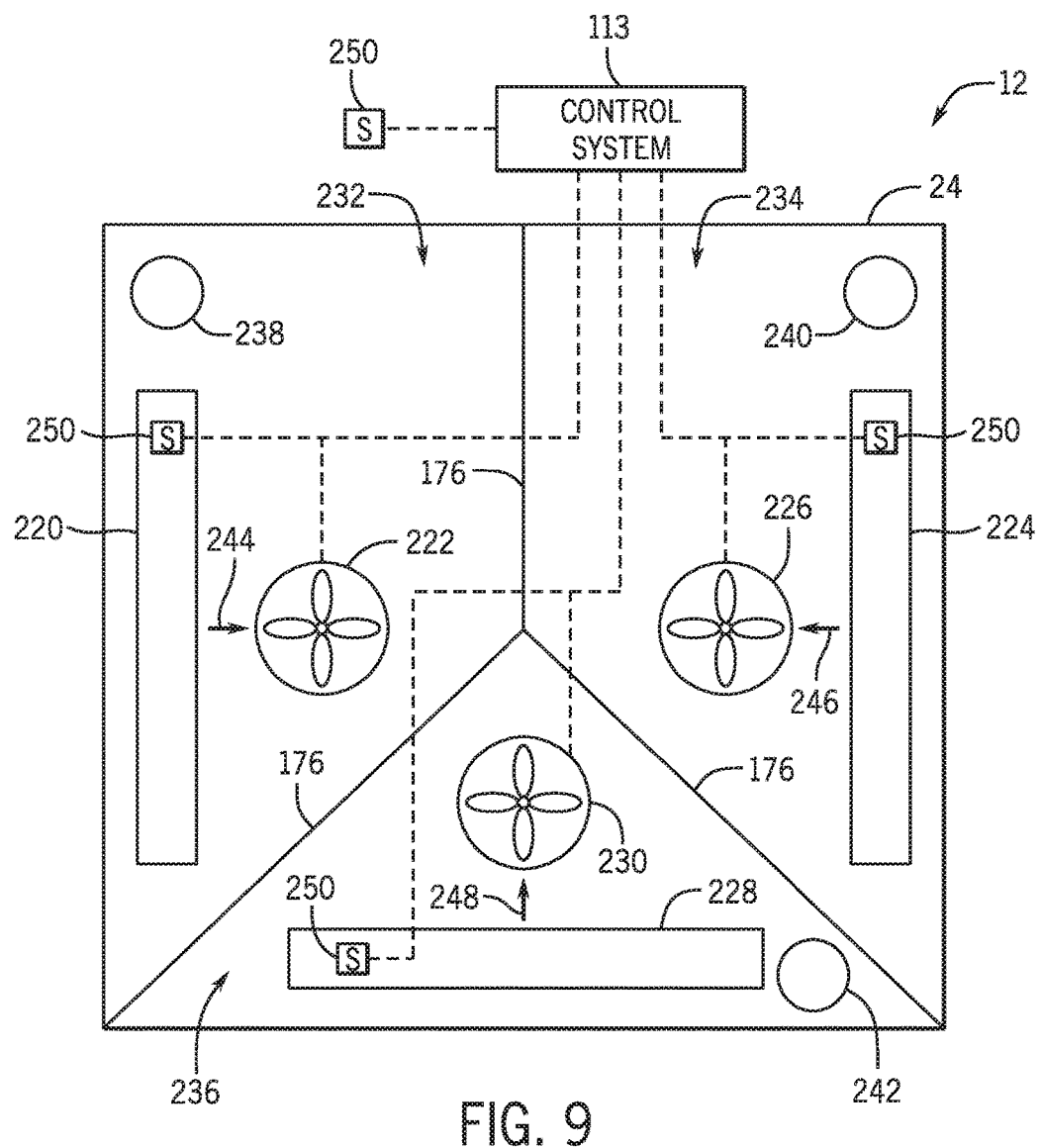
FIG. 9 is a schematic of an embodiment of an outdoor unit that may be used in the systems of FIGS. 1-3, in accordance with an aspect of the present disclosure.

FIG. 9 is a schematic of an embodiment of the HVAC unit 12, such as an outdoor unit, that includes three condensers and three fans. For example, in the illustrated embodiment of FIG. 9, the HVAC unit 12 includes a first condenser 220 and a corresponding first fan 222, a second condenser 224 and a corresponding second fan 226, and a third condenser 228 and a corresponding third fan 230. Condensers 220, 224, and 228 can each have capacities that are equal to one another, or in other embodiments, the condensers 220, 224, and 228 may have different capacities. In some embodiments, the fans 222, 226, and/or 230 may be multi-speed fans and/or variable speed fans. Additionally or alternatively, the fans 222, 226, and/or 230 may be operated utilizing a control scheme, such as a control scheme that operates the fans 222, 226, and/or 230 based on head pressure of the working fluid. The capacity of each of the condensers 220, 224, and/or 228 may be greater than the capacity of the condensers 160, 162, 164, and 166 of the HVAC unit 12 of FIG. 8. The dividers 176 of the HVAC unit 12 of FIG. 9 form a first section 232 having the first condenser 220 and the first fan 222, a second section 234 having the second condenser 224 and the second fan 226, and a third section 236 having the third condenser 228 and the third fan 230. The HVAC unit 12 may further include a first compressor 238, a second compressor 240, and a third compressor 242 corresponding to the respective condensers 220, 224, and 228. In other embodiments, a single compressor may be shared between two or more of the condensers 220, 224, and 228. In some embodiments, the compressors 238, 240, and/or 242 may include multi-staged compressors, multi-speed compressors, tandem compressors, and/or variable speed compressors. In any case, working fluid may circulate through one or more of the condensers 220, 224, and 228 when the HVAC unit 12 operates to heat or cool the building 10. Accordingly, the illustrated embodiment of the HVAC unit 12 of FIG. 9 has at least three stages of heating and/or cooling.

For example, the first fan 222 receives power and directs an airflow 244 across coils of the first condenser 220 when the working fluid flows through the coils of the first condenser 220, for example, via the first compressor 238. Additionally, the second fan 226 receives power and directs an airflow 246 across coils of the second condenser 224 when the working fluid flows through the coils of the second condenser 244, for example, via the second compressor 240. Further, the third fan 230 receives power and directs an airflow 248 across coils of the third condenser 228 when the working fluid flows through the coils of the third condenser 228, for example, via the third compressor 242. To increase the IEER of the HVAC unit 12, the fans 222, 226, and 230 may be selectively operated based on an operating state of the condensers 220, 224, and 228.

In some embodiments, the HVAC unit 12 includes sensors 250 that provide feedback to the control system 113 indicative of an operating state of the condensers 220, 224, and 228. Accordingly, the control system 113 may selectively operate the fans 222, 226, and 230 based on the feedback received from the sensors 250. Airflow may not flow over the coils of inactive condensers 220, 224, and/or 228, which may increase the IEER of the HVAC unit 12.

Figure 10:
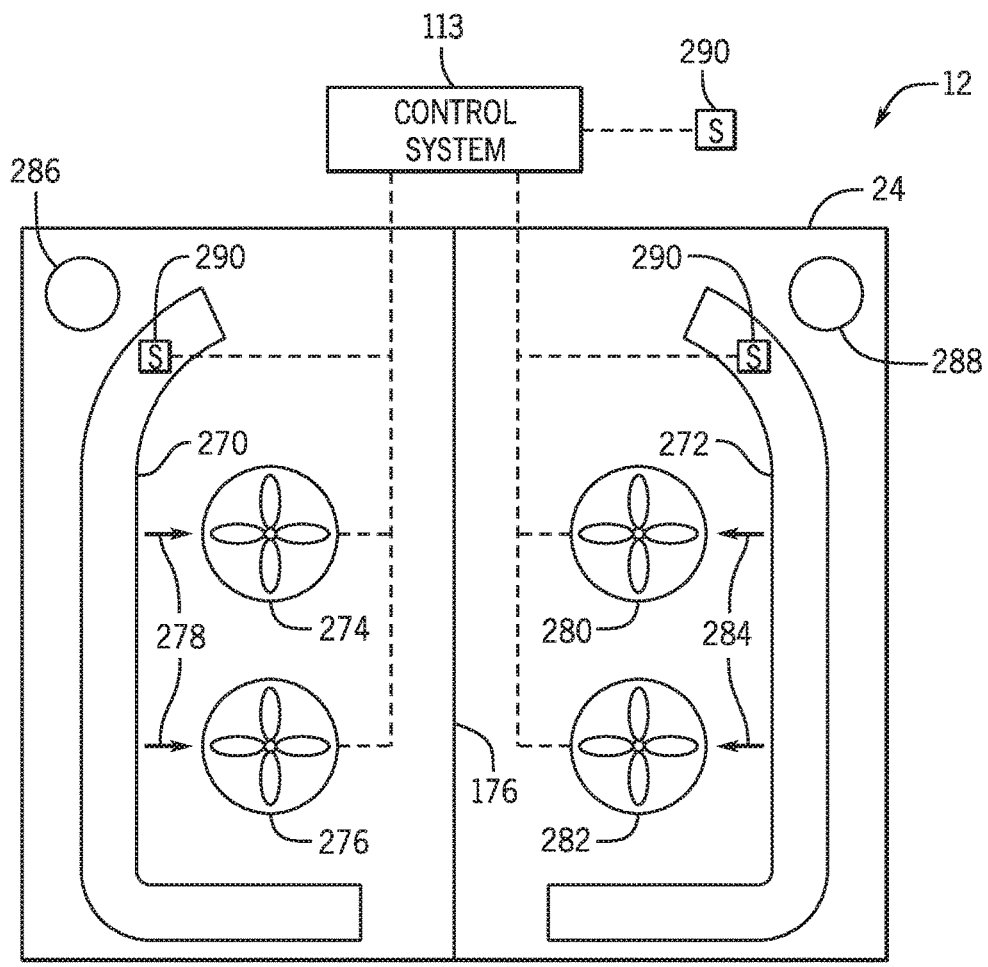
FIG. 10 is a schematic of an embodiment of an outdoor unit that may be used in the systems of FIGS. 1-3, in accordance with an aspect of the present disclosure.

FIG. 10 is a schematic of an embodiment of the HVAC unit 12 having two condensers and four fans, where two fans may direct air across coils of a single condenser. For example, the HVAC unit 12 includes a first condenser 270 and a second condenser 272 separated by the divider 176. A first fan 274 and a second fan 276 direct an airflow 278 across coils of the first condenser 270 and a third fan 280 and a fourth fan 282 direct an airflow 284 across coils of the second condenser 272. In some embodiments, the fans 274, 276, 280, and/or 282 may be multi-speed fans and/or variable speed fans. Additionally or alternatively, the fans 274, 276, 280, and/or 282 may be operated utilizing a control scheme, such as a control scheme that operates the fans 274, 276, 280, and/or 282 based on head pressure of the working fluid. Additionally, the HVAC unit includes a first compressor 286 and a second compressor 288 that circulate working fluid through the coils of the first condenser 270 and the second condenser 272, respectively. The compressors 286 and 288 may be multi-stage compressors, multi-speed compressors, tandem compressors, and/or variable speed compressors having the same or different capacities. In other embodiments, the HVAC unit 12 includes a single compressor. In any case, working fluid may circulate through one or both of the condensers 270 and 272 when the HVAC unit 12 operates to heat or cool the building 10.

The HVAC unit 12 may operate with four stages of heating or cooling based on the operating state of the condensers 270 and 272, as well as an operating state of the fans 274, 276, 280, and 282. For example, when working fluid is directed through the coils of the first condenser 270, the first fan 274 and/or the second fan 276 may flow the airflow 278 across the first condenser 270. When only one of the first fan 274 and the second fan 276 operates, the HVAC unit 12 may operate at a first stage of heating or cooling, such as approximately 25% capacity. When both the first fan 274 and the second fan 276 operate, the HVAC unit 12 may operate at a second stage of heating or cooling, such as approximately 50% capacity. Further, when working fluid is also directed through the coils of the second condenser 272, the third fan 280 and/or the fourth fan 282 may flow the airflow 284 across the coils of the second condenser 272. When only one of the third fan 280 and the fourth fan 282 operates, the HVAC unit 12 may operate at a third stage of heating or cooling, such as when the working fluid is directed through the coils of the first condenser 270 and both the first fan 274 and the second fan 276 operate the HVAC unit 12. When operating at the third stage of heating or cooling, the HVAC unit 12 may operate at approximately 75% capacity, for example. Additionally, when both the third fan 280 and the fourth fan 282 operate, the HVAC unit 12 may operate at a fourth stage of heating or cooling, such as when the working fluid is also directed through the coils of the first condenser 270 and both the first fan 272 and the second fan 276 operate, the HVAC unit 12 operates at approximately 100% capacity. In other embodiments, the fans 274, 276, 280, and 282 may be variable speed fans that may enable the HVAC unit 12 to operate with more than four stages of cooling.

In some embodiments, the HVAC unit 12 includes sensors 290 that provide feedback to the control system 113 indicative of an operating state of the condensers 270 and 272. Accordingly, the control system 113 may selectively operate the fans 274, 276, 280, and 282 based on the feedback received from the sensors 290. Airflow may not flow over the coils of inactive condensers 270 or 272, which may increase the IEER of the HVAC unit 12.

Figure 11:
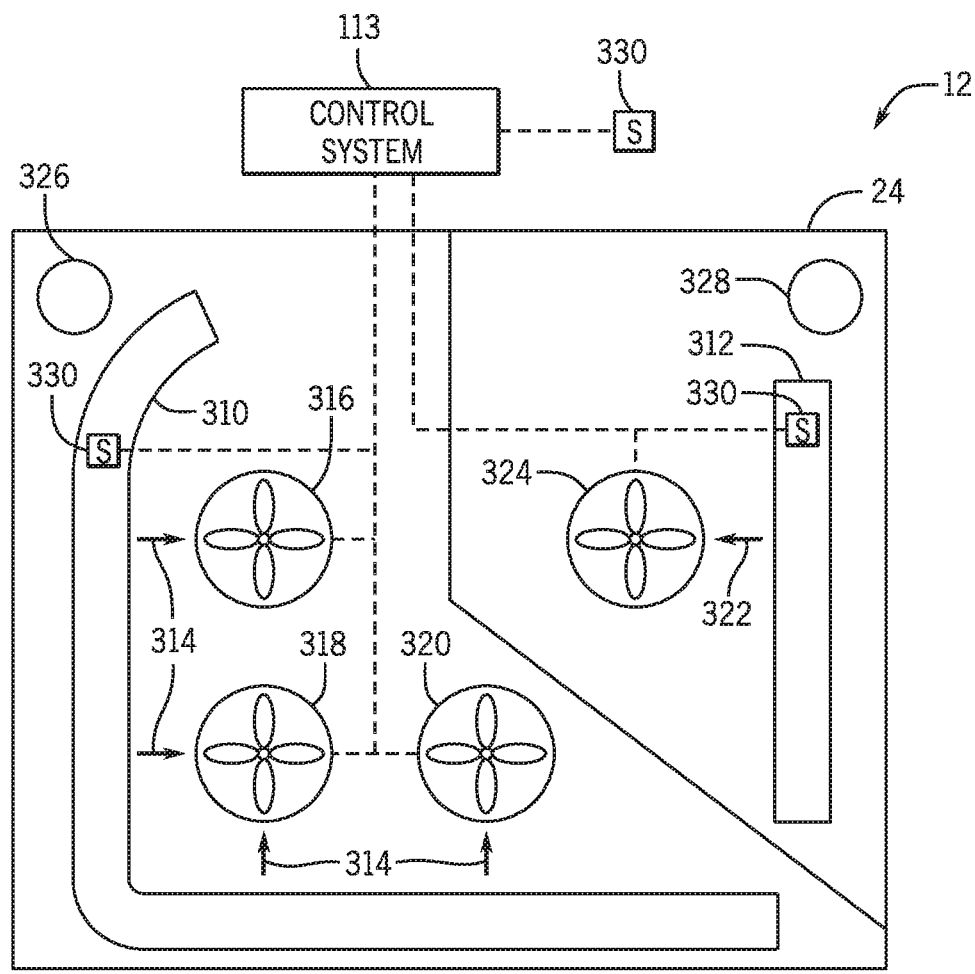
FIG. 11 is a schematic of an embodiment of an outdoor unit that may be used in the systems of FIGS. 1-3, in accordance with an aspect of the present disclosure.

FIG. 11 is a schematic of an embodiment of the HVAC unit 12 having two different condenser sizes. For example, the HVAC unit includes a first condenser 310 and a second condenser 312. An airflow 314 is directed across the first condenser 310 by a first fan 316, a second fan 318, and/or a third fan 320, whereas an airflow 322 is directed across the second condenser 312 by a fourth fan 324. Accordingly, the first condenser 310 may include a capacity that is approximately (e.g., within 5% of, within 10% of, or within 20% of) three times greater than a capacity of the second condenser 312. In some embodiments, the fans 316, 318, and/or 320 may be multi-speed fans and/or variable speed fans. Additionally or alternatively, the fans 316, 318, and/or 320 may be operated utilizing a control scheme, such as a control scheme that operates the fans 316, 318, and/or 320 based on head pressure of the working fluid. Further, the HVAC unit 12 includes a first compressor 326 that circulates working fluid (e.g., refrigerant) through the first condenser 310 and a second compressor 328 that circulates working fluid through the second condenser 312. In some embodiments, the first compressor 326 has a capacity that is approximately (e.g., within 5% of, within 10% of, or within 20% of) three times greater than a capacity of the second compressor 328. In other embodiments, the HVAC unit 12 may include a single compressor that circulates the working fluid through both the first condenser 310 and the second condenser 312. Additionally or alternatively, the compressors 310 and 312 may include multi-staged compressors, multi-speed compressors, tandem compressors, and/or variable speed compressors.

The HVAC unit 12 may operate with four stages of heating or cooling based on the operating state of the condensers 310 and 312 as well as an operating state of the fans 316, 318, 320, and 324. For example, when working fluid is directed through the coils of the first condenser 310, the first fan 316, the second fan 318, and/or the third fan 320 may flow the airflow 314 across the first condenser 310. When only one of the first fan 316, the second fan 318, and the third fan 320 operates, the HVAC unit 12 may operate at a first stage of heating or cooling, such as approximately 25% capacity. When two of the first fan 316, the second fan 318, and the third fan 320 operate, the HVAC unit 12 may operate at a second stage of heating or cooling, such as approximately 50% capacity. Further, when all three of the first fan 316, the second fan 318, and the third fan 320 operate, the HVAC unit 12 may operate at a third stage of heating or cooling, such as approximately 75% capacity. Additionally, when working fluid is also directed through the coils of the second condenser 312 and the fourth fan 324 flows the airflow 322 across the coils of the second condenser 272, the HVAC unit 12 may operate at a fourth stage of heating or cooling, such as approximately 100% capacity. In other embodiments, the fans 316, 318, 320, and/or 324 may be variable speed fans that may enable the HVAC unit 12 to operate with more than four stages of cooling.

In some embodiments, the HVAC unit 12 includes sensors 330 that provide feedback to the control system 113 indicative of an operating state of the condensers 310 and 312. Accordingly, the control system 113 may selectively operate the fans 316, 318, 320, and/or 324 based on the feedback received from the sensors 330. Airflow may not flow over the coils of inactive condensers 310 and/or 312, which may increase the IEER of the HVAC unit 12.

Figure 12:
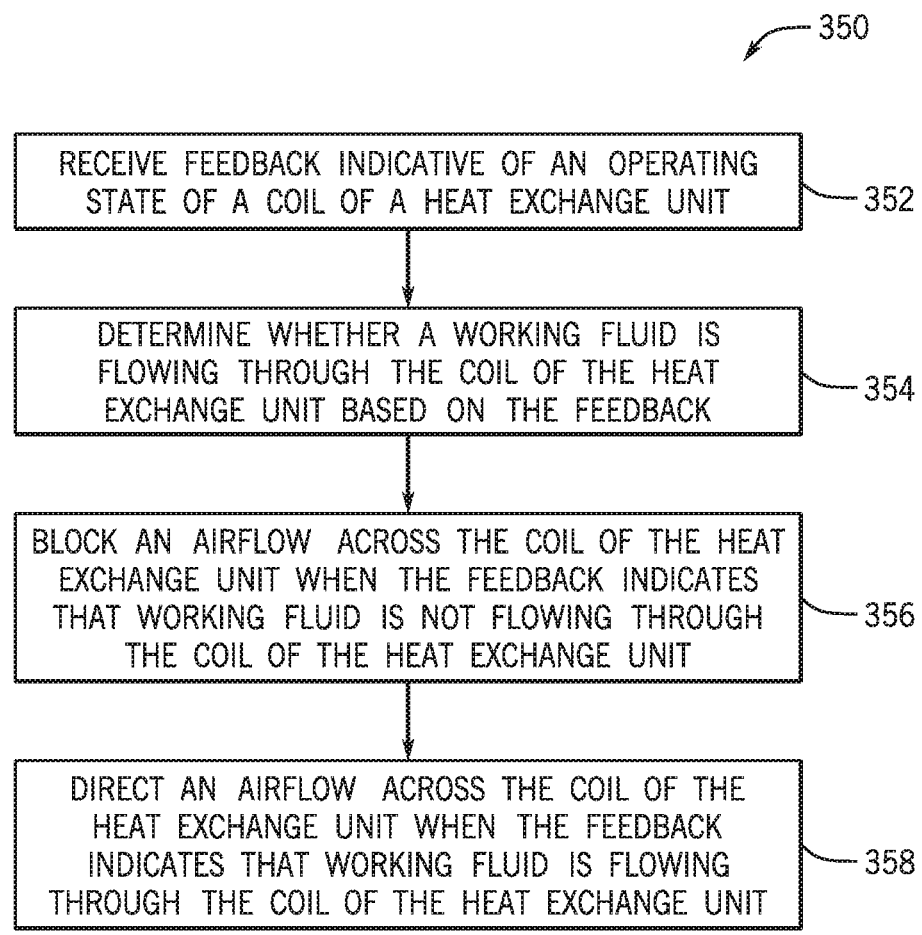
FIG. 12 is a block diagram of an embodiment of a process for operating the indoor and outdoor units of FIGS. 5-10, in accordance with an aspect of the present disclosure.

FIG. 12 is a block diagram of an embodiment of a process 350 that may be utilized to control operation of embodiments of the HVAC unit 12 of the present disclosure. For example, at block 352 the control system 113 receives feedback from the sensors 114, 202, 250, 290, and/or 330 indicative of an operating state of a coil, such as an evaporator or a condenser coil, of the HVAC unit 12. Accordingly, at block 354, the control system 113 determines whether a respective coil is active or inactive. In other words, the feedback from the sensors 114, 202, 250, 290, and/or 330 indicates whether working fluid flows through the respective coil, and thus, whether the coil is active or inactive.

At block 356, the control system 113 blocks an airflow across the respective coil when the respective coil is inactive. As discussed above, the control system 113 may actuate the louver 108 to a closed position, such that the airflow does not flow across the respective coil when in the inactive state. In other embodiments, the control system 113 may interrupt a power supply to a fan when the respective coil is in the inactive state, such that the airflow does not flow across the respective coil. In such embodiments, the respective coil and fan are isolated from an active coil and a fan that receives a power supply, such that the airflow to the active coil is blocked from flowing across the respective coil.

At block 358, the control system 113 directs airflow across the respective coil when the respective coil is active. As discussed above, the control system 113 may actuate the louver 108 to an open position, such that the airflow flows across the respective coil when in the active state. In other embodiments, the control system 113 may restore a power supply to a fan when the respective coil is in the active state, such that the airflow flows across the respective coil. Blocking airflow across inactive coils and isolating active coils from inactive coils increases an IEER of the HVAC unit 12 by increasing an efficiency of the HVAC unit 12 at partial loads.

As set forth above, the heat exchange units of the present disclosure may provide one or more technical effects useful in the operation of HVAC systems. For example, embodiments of the present approach isolate active coils of a heat exchange unit from inactive coils of the heat exchange unit to increase an integrated energy efficiency ratio (IEER) of the heat exchange unit. The IEER calculates a rating for a heat exchange unit based on efficiencies of the heat exchange unit at partial loads. Accordingly, blocking airflow across inactive coils of the heat exchange unit increases the IEER by enhancing an efficiency of the heat exchange unit at partial operating loads. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) system, comprising:
a cabinet having a first section, a second section, and a barrier configured to direct a first airflow through the first section and a second airflow through the second section;
a compressor configured to circulate a working fluid through the HVAC system;
a first coil disposed in the first section of the cabinet and configured to receive the working fluid and to establish a first heat exchange relationship between the working fluid and the first airflow directed across the first coil;
a second coil disposed in the second section of the cabinet and configured to receive the working fluid and to establish a second heat exchange relationship between the working fluid and the second airflow directed across the second coil; and
a fan configured to direct the first airflow across the first coil, the second airflow across the second coil, or both;
wherein the first airflow is not flowing across the first coil when the first coil is inactive and the second airflow is not flowing across the second coil when the second coil is inactive.

2. The HVAC system of claim 1, wherein the barrier comprises a louver configured to isolate the first airflow across the first coil from the second airflow across the second coil when the first coil is inactive or when the second coil is inactive.

3. The HVAC system of claim 2, wherein the louver is in an open position when the first coil is active and the second coil is active, such that the first airflow and the second airflow are not isolated from one another.

4. The HVAC system of claim 1, wherein the fan is a first fan, and further comprising a second fan, wherein the first fan is positioned in the first section and the second fan is positioned in the second section.

5. The HVAC system of claim 4, wherein the first fan is powered off when the first coil is inactive, and wherein the second fan is powered off when the second coil is inactive.

6. The HVAC system of claim 5, wherein the first fan, the second fan, or both comprises a plenum fan.

7. The HVAC system of claim 5, wherein the first fan, the second fan, or both comprises a variable speed fan.

8. The HVAC system of claim 1, comprising an additional compressor, wherein the compressor is positioned in the first section and the additional compressor is positioned in the second section.

9. The HVAC system of claim 1, wherein the fan is a first fan configured to direct the first airflow across the first coil, and further comprising:
a second fan configured to direct the first airflow across the first coil;
a third fan configured to direct the second airflow across the second coil; and
a fourth fan configured to direct the second airflow across the second coil.

10. The HVAC system of claim 1, comprising:
a third coil configured to receive the working fluid and to establish a third heat exchange relationship between the working fluid and a third airflow directed across the third coil;
a fourth coil configured to receive the working fluid and to establish a fourth heat exchange relationship between the working fluid and a fourth airflow directed across the fourth coil; and
an additional barrier configured to isolate the third airflow across the third coil, and the fourth airflow across the fourth coil, wherein the third airflow is not flowing across the third coil when the third coil is inactive, and the fourth airflow is not flowing across the fourth coil when the fourth coil is inactive.

11. The HVAC system of claim 1, comprising a sensor configured to monitor a load demand of the HVAC system, a flow rate of the working fluid through the first coil, a flow rate of working fluid through the second coil, a voltage supplied to the compressor, or a combination thereof.

12. The HVAC system of claim 1, comprising a control system communicatively coupled to a sensor configured to monitor an operating state of the first coil and the second coil, wherein the control system is configured to adjust the barrier, the fan, or both, such that the first airflow is not flowing across the first coil when the first coil is inactive and the second airflow is not flowing across the second coil when the second coil is inactive.

13. A heating, ventilating, and air conditioning (HVAC) system, comprising:
a cabinet;
a compressor disposed within the cabinet and configured to circulate a working fluid through the HVAC system;
a first coil disposed within the cabinet and configured to receive the working fluid and to establish a first heat exchange relationship between the working fluid and a first airflow directed across the first coil;
a second coil disposed within the cabinet and configured to receive the working fluid and to establish a second heat exchange relationship between the working fluid and a second airflow directed across the second coil;
a barrier positioned in the cabinet between the first coil and the second coil, wherein the barrier is configured to isolate the first airflow across the first coil from the second airflow across the second coil;
a fan configured to direct the first airflow across the first coil, the second airflow across the second coil, or both;
a sensor configured to determine an operating state of the first coil and the second coil; and
a control system configured to receive feedback from the sensor indicative of an operating state of the first coil and the second coil, block the first airflow across the first coil when the feedback indicates that first coil is inactive, block the second airflow across the second coil when the feedback indicates that the second coil is inactive, direct the first airflow across the first coil when the feedback indicates that the first coil is active, and direct the second airflow across the second coil when the feedback indicates that the second coil is active.

14. The HVAC system of claim 13, wherein the sensor comprises a load sensor, a flow sensor, a pressure sensor, or a voltage sensor.

15. The HVAC system of claim 13, wherein the barrier comprises a louver configured to isolate the first airflow directed across the first coil from the second airflow directed across the second coil when the first coil is inactive or when the second coil is inactive.

16. The HVAC system of claim 15, wherein control system is configured to adjust the louver from an open position to a closed position when the first coil or the second coil switches from an active state to an inactive state.

17. The HVAC system of claim 13, wherein the fan is a first fan, and further comprising a second fan, wherein the barrier forms a first section and a second section in the cabinet of the HVAC system, and wherein the first coil and the first fan are positioned in the first section and the second coil and the second fan are positioned in the second section.

18. The HVAC system of claim 17, wherein the control system is configured to interrupt a first supply of power to the first fan when the first coil is inactive, and wherein the control system is configured to interrupt a second supply of power to the second fan when the second coil is inactive.

19. A method, comprising:
receiving feedback indicative of an operating state of a plurality of coils of a heat exchange unit, wherein the heat exchange unit includes a cabinet having a plurality of sections that are separated from one another by a barrier, wherein each coil of the plurality of coils is disposed within a respective section of the plurality of sections;

determining whether a working fluid is flowing through a coil of the plurality of coils of the heat exchange unit based on the feedback;

blocking an airflow through the respective section of the plurality of sections having the coil of the plurality of coils and across the coil of the plurality of coils when the feedback indicates that the working fluid is not flowing through the coil of the plurality of coils of the heat exchange unit; and directing the airflow across the coil of the plurality of coils of the heat exchange unit when the feedback indicates that the working fluid is flowing through the coil of the plurality of coils of the heat exchange unit.

20. The method of claim 19, wherein receiving the feedback indicative of the operating state of the coil of the plurality of coils of the heat exchange unit comprises receiving feedback from a sensor configured to monitor a load of the heat exchange unit, a flow rate of the working fluid through the coil of the plurality of coils of the heat exchange unit, a voltage supplied to a compressor of the heat exchange unit, or a combination thereof.

21. The method of claim 19, wherein blocking the airflow through the respective section of the plurality of sections having the coil of the plurality of coils and across the coil of the plurality of coils of the heat exchange unit when the feedback indicates that the working fluid is not flowing through the coil of the plurality of coils of the heat exchange unit comprises interrupting a supply of power to a fan of the heat exchange unit.

22. The method of claim 19, wherein blocking the airflow across the coil of the plurality of coils of the heat exchange unit when the feedback indicates that the working fluid is not flowing through the coil of the plurality of coils of the heat exchange unit comprises adjusting a louver from an open position to a closed position.

* * * * *